United States Patent [19]
Sakai

[11] Patent Number: 5,616,099
[45] Date of Patent: Apr. 1, 1997

[54] LOCK-UP CONTROL SYSTEM FOR TORQUE CONVERTER

[75] Inventor: Hiromasa Sakai, Yokosuka, Japan

[73] Assignee: Nissan Motor Co., Ltd., Kanagawa Pref., Japan

[21] Appl. No.: 557,537

[22] Filed: Nov. 14, 1995

[30] Foreign Application Priority Data

Nov. 14, 1994 [JP] Japan ..................... 6-279241

[51] Int. Cl.$^6$ ................................. B60K 41/02
[52] U.S. Cl. ........................ 477/169; 477/174; 477/175
[58] Field of Search ..................... 477/168, 169, 477/174, 175, 180

[56] References Cited

U.S. PATENT DOCUMENTS

| | | | |
|---|---|---|---|
| 4,662,493 | 5/1987 | Aoki et al. ............................ | 477/168 |
| 4,730,712 | 3/1988 | Ohkumo ................................ | 477/175 |
| 5,060,769 | 10/1991 | Yoshimura et al. ................ | 477/169 X |
| 5,086,894 | 2/1992 | Iizuka et al. ........................ | 477/180 X |
| 5,143,191 | 9/1992 | Nobumoto et al. ................ | 477/176 X |
| 5,152,386 | 10/1992 | Imamura ............................. | 477/168 |
| 5,213,186 | 5/1993 | Murata ................................ | 477/174 X |
| 5,265,017 | 11/1993 | Kaya et al. ........................ | 477/174 X |
| 5,277,287 | 1/1994 | Ishii et al. ........................... | 477/169 X |
| 5,378,211 | 1/1995 | Slicker et al. ..................... | 477/176 X |
| 5,535,863 | 7/1996 | Vukovich et al. ................. | 477/169 X |
| 5,547,438 | 8/1996 | Nozaki et al. ..................... | 477/169 |

OTHER PUBLICATIONS

"RE4R01A Type Automatic Transmission Service Manual," by Nissan Motor Co.

Primary Examiner—Charles A. Marmor
Assistant Examiner—Peter Kwon
Attorney, Agent, or Firm—Lowe, Price, LeBlanc & Becker

[57] ABSTRACT

A lock-up control system for a torque converter, in a vehicle transmitting a driving torque of a prime mover to wheels via a power transmission unit including the torque converter which can establish direct coupling between an input element and an output element. The lock-up control system has an accelerator releasing detecting portion for detecting releasing of an accelerator for operating the prime mover, a lock-up range detecting portion for detecting a vehicle traveling condition falling within a lock-up range for establishing direct coupling of the input and output elements of the torque converter by means of a lock-up clutch, a lock-up progressing portion for progressing direct coupling between the input and output element of the torque converter by engagement of the lock-up clutch in response to the accelerator releasing detecting means and the lock-up range detecting means, when the vehicle traveling condition enters into the lock-up range, a coasting capacity detecting portion for detecting an engaging capacity of the lock-up clutch as progressing establishment of lock-up state, reaching a coasting capacity required for coasting of the vehicle, and a coasting capacity maintaining portion for holding the engaging capacity of the lock up clutch by interrupting progress of engagement of the lock-up clutch when the engaging capacity reaching the coasting capacity is detected.

2 Claims, 6 Drawing Sheets

FIG_2

FIG_3

LOCK-UP CONTROL SYSTEM FOR TORQUE CONVERTER

BACKGROUND OF THE INVENTION

1. Field of the Invention

The present invention relates to a lock-up control system for directly coupling input and output elements of a torque converter normally coupled with an output side of a prime mover of an automotive vehicle and forming a part of a power train.

2. Description of the Related Art

A power transmission unit, such as an automatic power transmission, includes a torque converter in a power transmission system for amplifying engine output torque and for absorbing torque fluctuation. The torque converter is generally low in power transmission efficiency since it transmits the engine torque between an input element and an output element via a working fluid. Therefore, recently, torque converters which establish direct engagement between the input elements and the output elements by means of lock-up clutches under vehicle traveling condition, in which the torque amplification function and torque fluctuation absorbing function are not required, are increasing.

On the other hand, upon establishing direct engagement between the input element and the output element of the torque converter by means of the lock-up clutch, when direct engagement (lock-up) is progressed abruptly, a lock-up shock is inherent associating with relative rotation between the input element and the output element of the torque converter. Accordingly, upon progressing engagement of the lock-up clutch, it is typical to gradually vary engaging condition at predetermined time gradient by feedforward controlling or feedback controlling control command value. Then, upon termination of the control, since completion of lock-up is difficult to judge, the control is terminated when the lock-up control command value reaches a maximum value.

In such lock-up control, as a result of releasing of accelerator pedal for the prime mover, when a vehicle traveling condition enters into a lock-up region for directly coupling the input element and the output element of the torque converter, lock-up control is performed in the similar manner as discussed with reference to FIG. 6.

At a timing $t_1$ of FIG. 6 it is assumed that, as a result of completely releasing of the accelerator pedal to make a throttle valve open angle TVO to 0, the vehicle traveling condition enters into a lock-up range to establish direct engagement between the input element and the output element of the torque converter. Then, a lock-up solenoid actuation duty cycle (lock-up duty) D as the lock-up control command value is gradually increased at a predetermined time gradient from 0%. In response to this, a torque converter release pressure $P_R$ is gradually decreased. As a result, an engaging capacity of the lock-up clutch determined by a pressure difference between the release pressure $P_R$ and a torque converter apply pressure $P_A$, is gradually increased. An engaging capacity is continued to increase even after a moment $t_2$ where the engaging capacity of the lock-up clutch reaches a coasting capacity required for coasting of the vehicle, engagement of the lock-up clutch is gradually progressed. By this, lock-up condition of the torque converter can be established without causing a shock. Then, at a moment $t_3$ where a lock-up duty D becomes a maximum value, the lock-up control is terminated smoothly. Then, by setting the lock-up duty D at the coasting capacity, control is transited to a coasting capacity control for maintaining the coasting capacity condition to maintain a lock-up condition suitable for coasting of the vehicle.

However, is such lock-up control upon releasing of the accelerator, the engaging capacity of the lock-up clutch can become excessive between the moment $t_2$ where the engaging capacity becomes the coasting capacity required for coasting of the vehicle and the moment $t_3$ where the lock-up duty D becomes the maximum value. Therefore, it is inherent to cause degradation of response characteristics in releasing lock-up. Accordingly, when an abrupt braking is performed during a period between the moments $t_2$ and $t_3$, particularly when vehicular wheels tends to cause locking, releasing of lock-up by releasing of the lock-up clutch cannot be effected quick enough to cause stalling of the engine.

SUMMARY OF THE INVENTION

In view of the drawbacks in the prior art, it is an object of the present invention to provide a lock-up control system for a torque converter which can prevent a lock-up capacity or engaging capacity from being built up beyond a coasting capacity required for coasting of a vehicle upon entry into a lock-up control in response to entry of a vehicle traveling condition into a lock-up range by fully releasing of an accelerator pedal.

In order to accomplish the above-mentioned and other objects, according to the invention, there is provided a lock-up control system for a torque converter, in a vehicle transmitting a driving torque of a prime mover to wheels via a power transmission unit including the torque converter which can establish direct coupling between an input element and an output element, the lock-up control system comprises:

accelerator releasing detecting means for detecting releasing of an accelerator for operating the prime mover;

lock-up range detecting means for detecting a vehicle traveling condition falling within a lock-up range for establishing direct coupling of the input and output elements of the torque converter by means of a lock-up clutch;

lock-up progressing means for progressing direct coupling between the input and output element of the torque converter by engagement of the lock-up clutch in response to the accelerator releasing detecting means and the lock-up range detecting means, when the vehicle traveling condition enters into the lock-up range;

coasting capacity detecting means for detecting an engaging capacity of the lock-up clutch as progressing establishment of lock-up state, reaching a coasting capacity required for coasting of the vehicle; and coasting capacity maintaining means for holding the engaging capacity of the lock up clutch by interrupting progress of engagement of the lock-up clutch when the engaging capacity reaching the coasting capacity is detected.

In a preferred embodiment according to the invention, the lock-up progressing means is constructed to gradually progress establishing of direct coupling of the input and output element of the torque converter by engagement of the clutch when the vehicle traveling condition enters into the lock-up region in response to releasing of the accelerator.

DESCRIPTION OF THE PREFERRED EMBODIMENT

Figure 1:
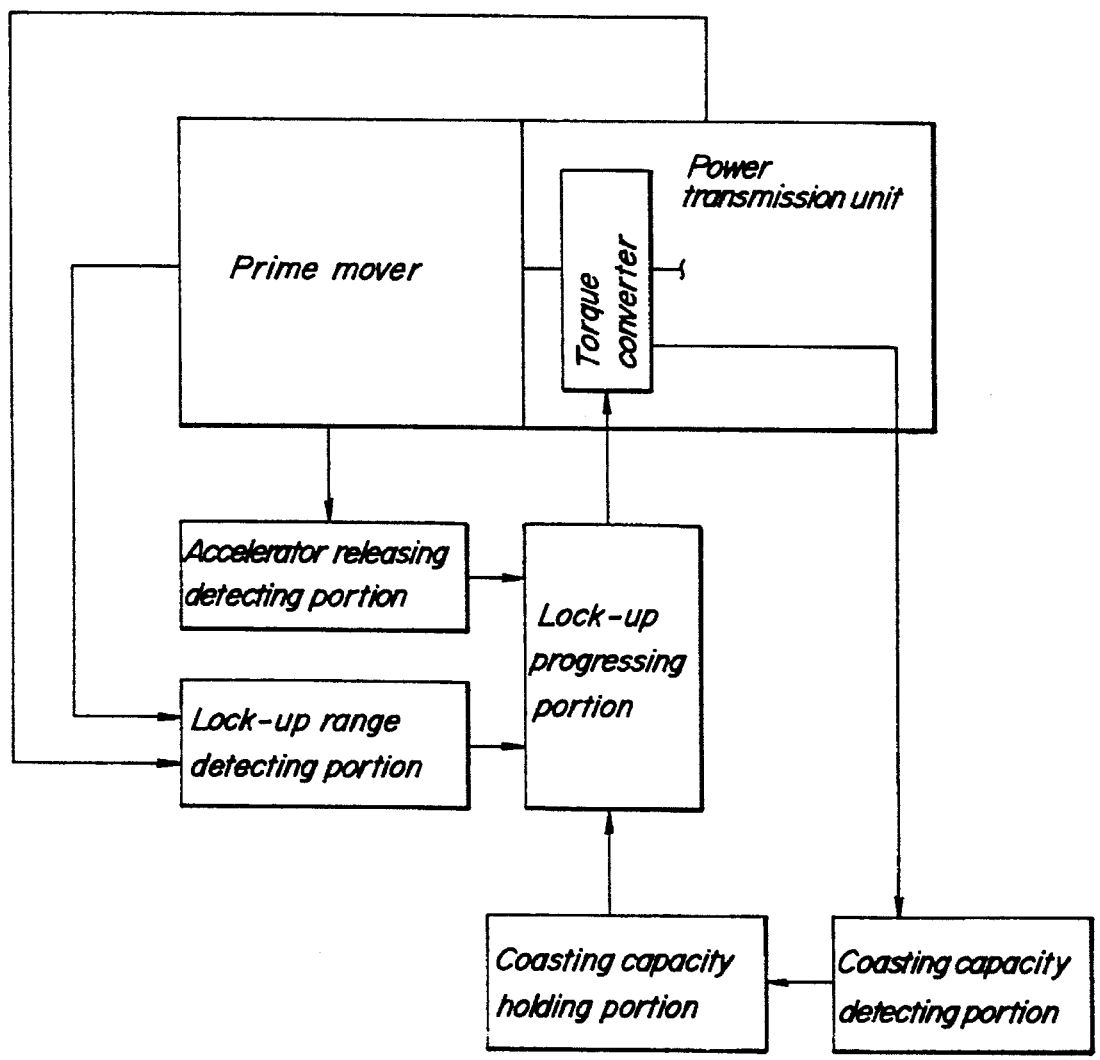
FIG. 1 is a conceptual illustration showing a lock-up control system for a torque converter according to the present invention.

The preferred embodiment of a lock-up control system according to the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

At first, a brief discussion will be given for general construction of a lock-up control system according to the present invention with reference to FIG. 1. As can be seen, a lock-up control system for a torque converter, in a vehicle transmitting a driving torque of a prime mover to wheels via a power transmission unit including the torque converter which can establish direct coupling between an input element and an output element. The lock-up control system has an accelerator releasing detecting portion for detecting releasing of an accelerator for operating the prime mover, a lock-up range detecting portion for detecting a vehicle traveling condition falling within a lock-up range for establishing direct coupling of the input and output elements of the torque converter by means of a lock-up clutch, a lock-up progressing portion for progressing direct coupling between the input and output element of the torque converter by engagement of the lock-up clutch in response to the accelerator releasing detecting means and the lock-up range detecting means, when the vehicle traveling condition enters into the lock-up range, a coasting capacity detecting portion for detecting an engaging capacity of the lock-up clutch as progressing establishment of lock-up state, reaching a coasting capacity required for coasting of the vehicle, and a coasting capacity maintaining portion for holding the engaging capacity of the lock up clutch by interrupting progress of engagement of the lock-up clutch when the engaging capacity reaching the coasting capacity is detected.

The lock-up progressing means may be constructed to gradually progress establishing of direct coupling of the input and output element of the torque converter by engagement of the clutch when the vehicle traveling condition enters into the lock-up region in response to releasing of the accelerator.

In the construction explained above, the torque converter generally transmits an engine output torque applied to the input element from an automotive internal combustion engine as a prime mover to the output element via the internal working fluid. When the vehicle traveling condition falls within a predetermined lock-up range, the input element and the output element are directly and mechanically coupled by means of the lock-up clutch. The power transmission unit incorporating the torque converter transmit the output torque of the prime mover to wheels for traveling of the vehicle.

Here, the accelerator releasing detecting portion detects fully released condition of the accelerator pedal for the prime mover. In conjunction therewith, the lock-up range detecting portion detects the vehicle traveling condition falls within the predetermined lock-up range. If accelerator is fully released and the vehicle traveling condition falls within the lock-up range, the lock-up progressing portion is responsive to the outputs of the accelerator releasing detecting portion and the lock-up range detecting portion to progress establishment of engagement of the lock-up clutch for direct coupling of the input and output elements of the torque converter. When the engaging capacity reaches the coasting capacity required for coasting of the vehicle, the coasting capacity detecting portion detects this to stop progress of engagement of the lock-up clutch by the coasting pressure holding portion. Here, the coasting capacity may be determined for optimizing fuel economy and engine braking effect in the coasting state of the engine. With the coasting capacity, the torque converter may be held in slip engagement state to certain extent of slip of the lock-up clutch.

Therefore, when lock-up control is initiated in response to the vehicle traveling state transiting into the lock-up range due to releasing of the accelerator pedal, the lock-up capacity will never exceed the coasting capacity required for coasting of the vehicle. Therefore, even when abrupt brake is applied while the lock-up control is active, releasing of lock-up clutch and whereby releasing of the lock-up of the torque converter can be quickly performed so that engine may never cause stalling.

In the preferred construction, engaging force of the lock-up clutch is gradually increased according to a predetermined time gradient. In such case, a shock which should be caused when the engaging capacity reaches the coasting capacity required for coasting of the vehicle can be eliminated.

Figure 2:
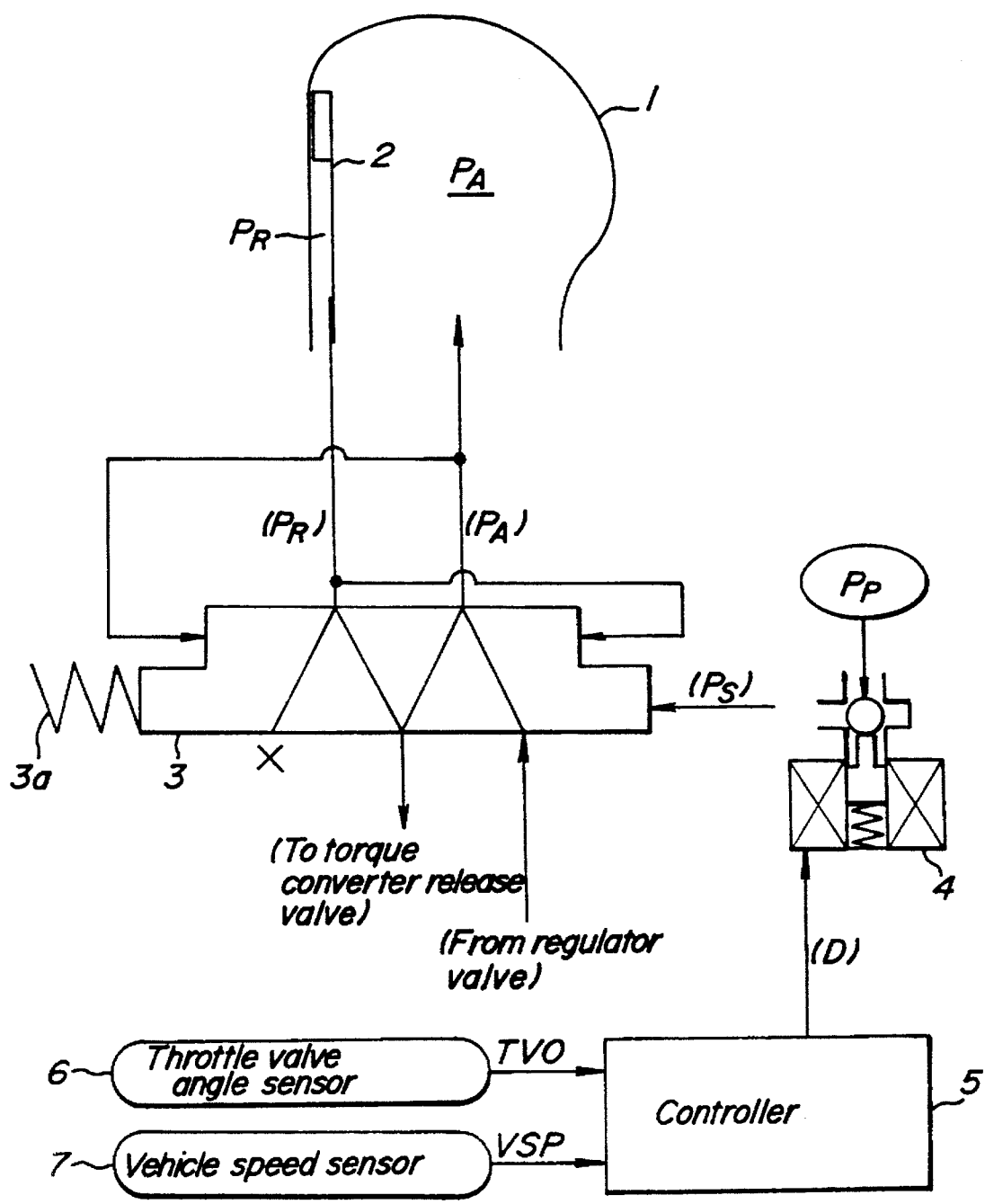
FIG. 2 is an illustration showing the preferred embodiment of a lock-up control system for a torque converter according to the present invention.

Referring to FIG. 2, there is illustrated the preferred embodiment of a lock-up control system for a torque converter according to the present invention. In FIG. 2, 1 denotes a torque converter of an automatic power transmission (power transmission unit). The torque converter 1 is similar to that employed in an automatic power transmission disclosed in "RE4R01A type Automatic Transmission Service Manual" (A261C07) issued by Nissan Motor Co., Ltd, 1987, in which power transmission is performed between an input element and an output element of the torque converter 1 via an internal working fluid. The torque converter 1 also incorporates a lock-up clutch 2 which rotates together with the output element of the torque converter. The lock-up clutch 2 establishes direct and mechanical coupling between the input and output elements of the torque converter when it is engaged with the input element of the torque converter.

The lock-up clutch 2 is responsive to a pressure difference $(P_A - P_R)$ of a torque converter apply pressure $P_A$ and a torque converter release pressure $P_R$, while the release pressure $P_R$ is higher than the apply pressure $P_A$, the lock-up clutch 2 is maintained in disengaged state. Thus, the input and output elements of the torque converter are not directly coupled. On the other hand, when the release pressure $P_R$ becomes lower than the apply pressure $P_A$, the lock-up clutch 2 is engaged to directly and mechanically connect the input and output elements of the torque converter 1. In the latter case, upon establishing engagement, an engaging capacity of the lock-up clutch 2, i.e. a lock-up capacity is determined by the pressure difference $P_A-P_R$. Namely, greater pressure difference causes greater engaging capacity of the lock-up clutch 2 to increasing the lock-up capacity.

Figure 3:
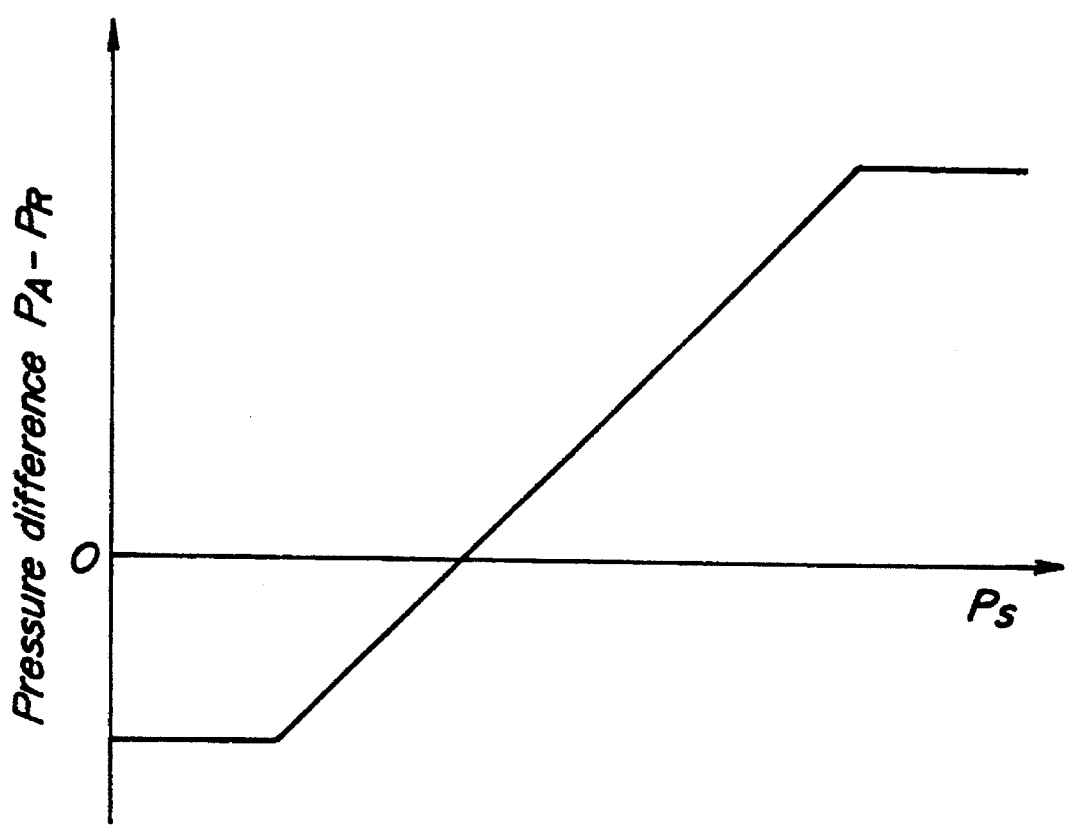
FIG. 3 is a chart showing operation of a lock-up control valve in the preferred embodiment.

As is well known, the pressure difference $P_A-P_R$ is controlled by a lock-up control valve 3. For the lock-up control valve 3, the apply pressure $P_A$ and the release pressure $P_R$ are applied in mutually opposite direction. In addition, a spring force of a spring 3a is applied in the direction of the apply pressure $P_A$. On the other hand, a signal pressure $P_S$ is applied in a direction of the release pressure $P_R$. The lock-up control valve determines the pressure difference $P_A-P_R$ so as to establish equilibrium between the forces applied in the apply direction (apply pressure $P_A$ and the spring force) and the force applied in the release direction (release pressure $P_R$ an the signal pressure). Thus, the pressure difference $P_A-P_R$ is varied in a characteristics shown in FIG. 3 for example, depending upon variation of the signal pressure $P_S$.

The signal pressure $P_S$ is generated depending upon a lock-up duty cycle D by a lock-up solenoid 4 with taking a pump pressure $P_P$ is an original pressure. The duty cycle D of the lock-up duty is electronically controlled by a controller 5. To the controller 5, a signal from a throttle angle sensor 6 detecting a throttle valve open angle TVO of a not shown engine (prime mover) and a signal from a vehicle speed sensor 7 detecting a vehicle speed VSP are input.

Figure 4:
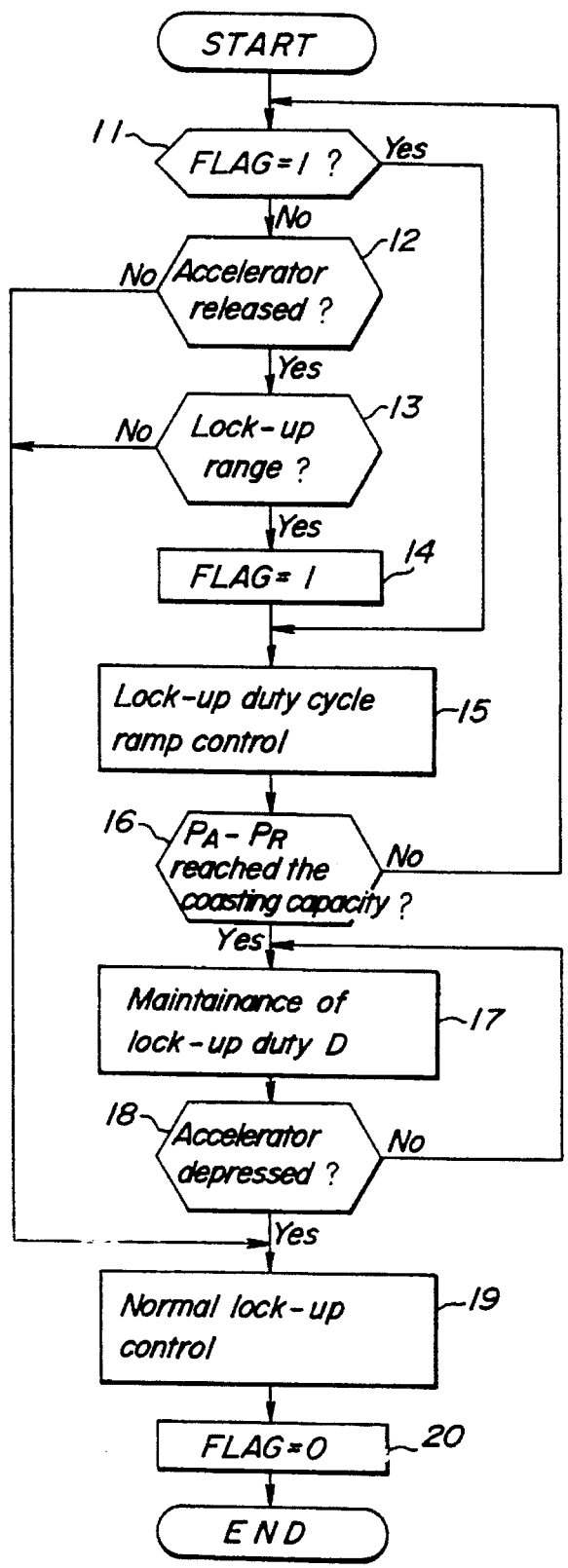
FIG. 4 is a flowchart showing a lock-up control program executed by a controller in the preferred embodiment.

The controller 5 executes a control program shown in FIG. 4 on the basis of the input information to perform duty control for the lock-up solenoid 4, namely lock-up control of the torque converter 1. At first, at a step 11, a flag FLAG indicative whether the current lock-up control is triggered in response to the vehicle traveling condition falling in a lock-up range associating with fully releasing of an accelerator pedal, or not. In the shown embodiment, the flag FLAG is set (1) when the vehicle traveling condition falls within the lock-up range in response to fully releasing of the accelerator. When the flag FLAG is not set (0) as checked at the step 11, the vehicle traveling condition is again checked at steps 12 and 13. At the step 12, check is performed whether the accelerator pedal is fully released or not. The check at the step 12 is performed by checking whether the throttle valve open angle TVO is 0 or not. On the other hand, at the step 13, check is performed whether the vehicle traveling condition falls within the lock-up range on the basis of the throttle valve open angle TVO and the vehicle speed VSP. If the answer at both of the steps 12 and 13 are positive, judgement is made that the vehicle traveling condition enters into the lock-up range due to releasing of the accelerator pedal.

When positive judgement is made at the step 13 and thus the vehicle traveling condition falls within the lock-up range caused by releasing of the accelerator pedal, the process is advanced to a step 14. Otherwise, the process is advanced to a step 19 skipping steps 14 to 18, to perform normal lock-up control by controlling the duty cycle of the solenoid 4. In such case, the flag FLAG is reset (0) at a step 20.

At a step 14 which is processed when judgement is made that the vehicle traveling condition falls within the lock-up range caused by releasing of the accelerator pedal, the flag FLAG is set (1), Subsequently, at a step 15, ramp control to gradually increase the lock-up duty cycle D for the solenoid 4 so that engagement is the lock-up clutch is gradually established with a predetermined time gradient which may be a maximum gradient not to cause lock-up shock. Then, at a step 16 which corresponding to a coasting capacity detecting means in FIG. 1, check is performed whether the pressure difference $P_A-P_R$ between the apply pressure $P_A$ and the release pressure $P_R$ reaches a coasting capacity required for coasting of the vehicle. The process through the steps 11 to 16 is repeated until the pressure difference $P_A-P_R$ reaches the coasting capacity. Thus, ramp control for the lock-up duty cycle D is continued.

Once the pressure difference $P_A-P_R$ reaches the coasting capacity, a control for maintaining the lock-up duty cycle D is performed at a step 17, which corresponds to a coasting capacity detecting means of FIG. 1. The lock-up duty cycle D is then maintained until depression of the accelerator pedal is detected at a step 18.

When depression of the accelerator pedal is detected at the step 18, normal lock-up control is performed at the step 19. Then, when the vehicle traveling condition still falls within the lock-up range, the lock-up duty cycle D is increased toward a maximum value to establish complete engagement of the lock-up clutch. Then, at the step 20, the flag FLAG is reset (0) as set forth above.

Figure 5:
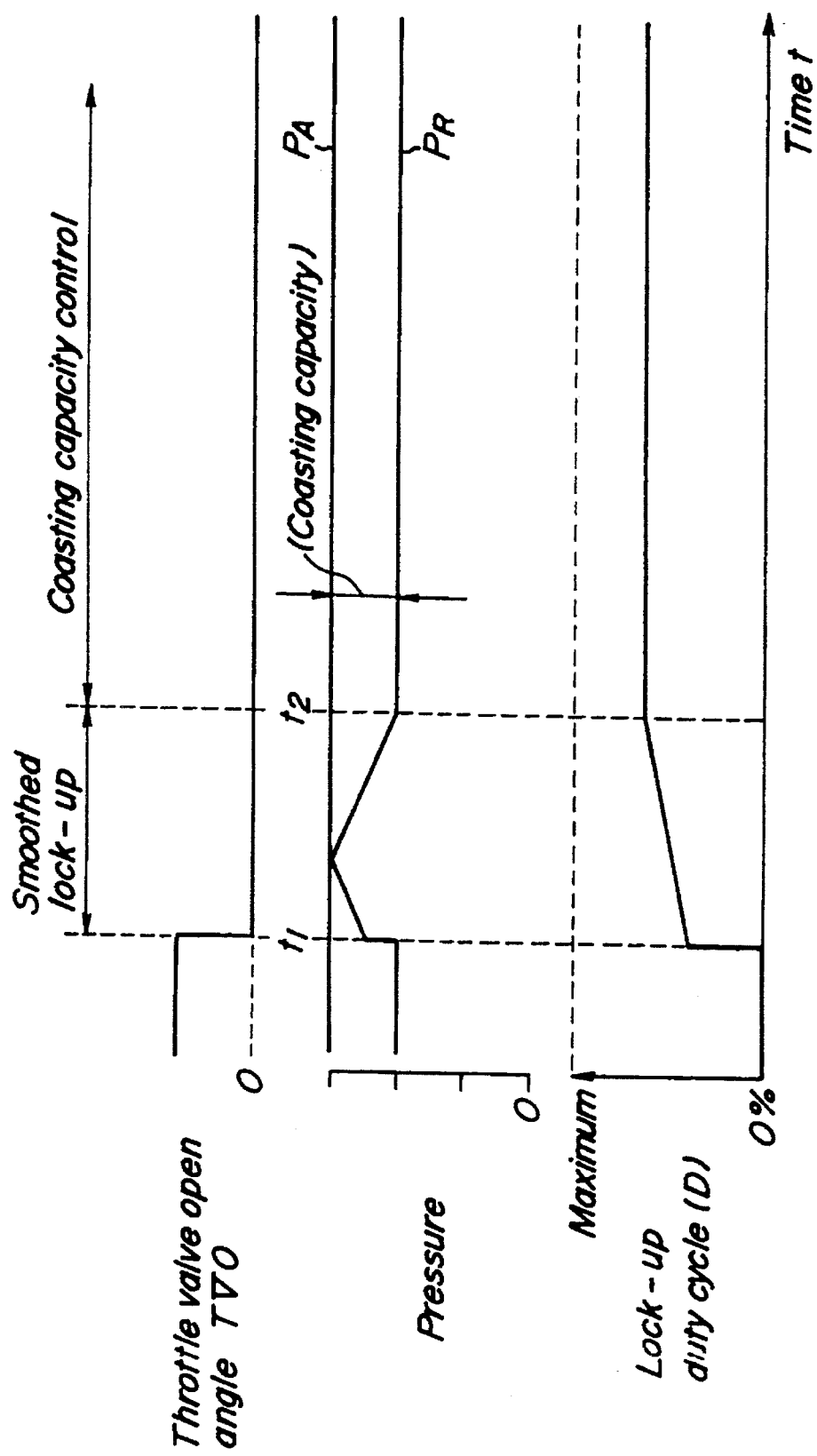
FIG. 5 is an operational timing chart showing a lock-up control upon releasing of accelerator pedal in the illustrated embodiment of the lock-up control system.
Figure 6:
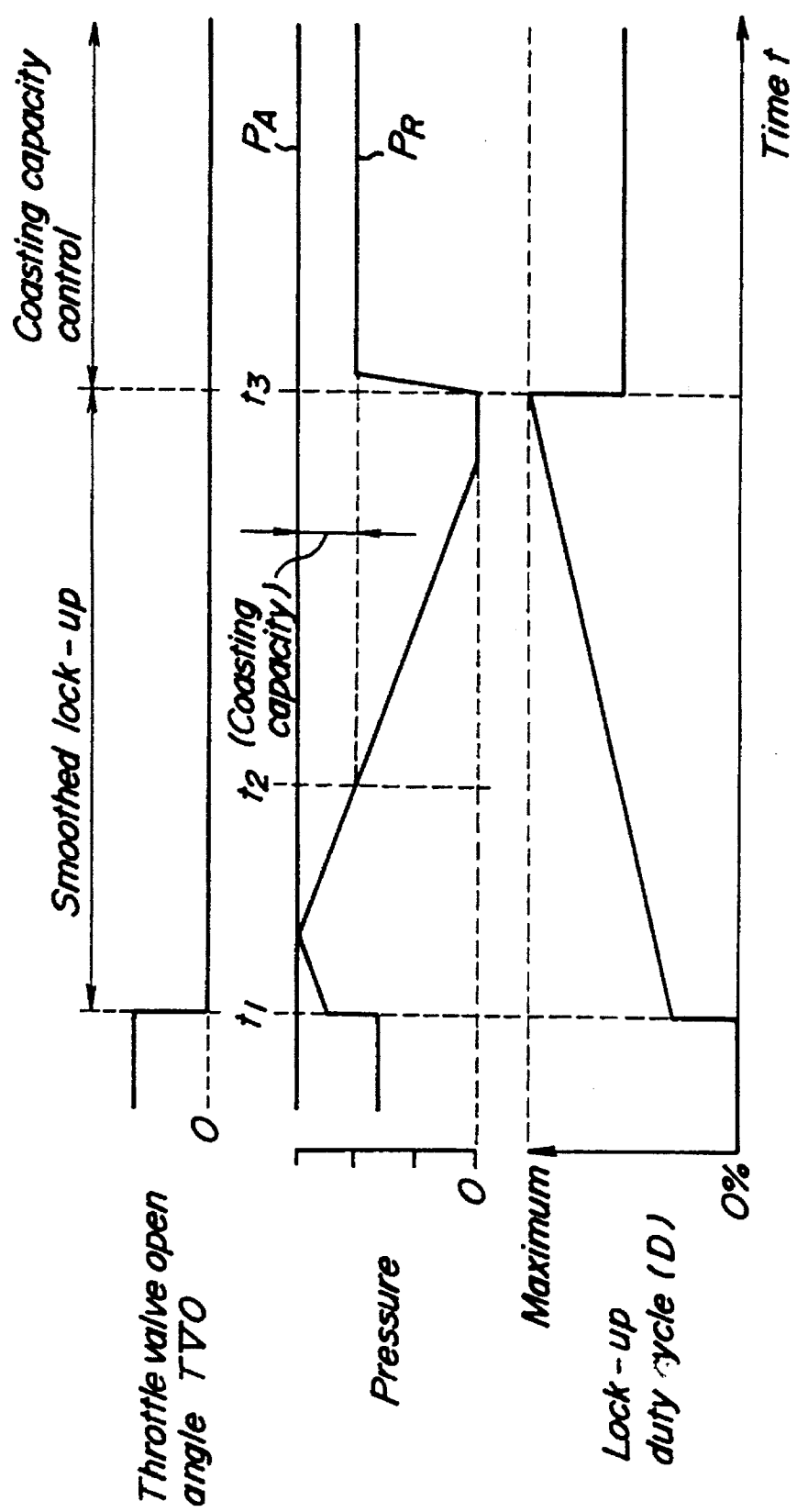
FIG. 6 is an operational timing chart showing a lock-up control upon releasing in the conventional lock-up control system.

The lock-up control upon releasing of the accelerator pedal will be discussed with reference to FIG. 5. It is assumed that, at a time $t_1$, the accelerator pedal is fully released to make the throttle valve open angle to be 0, and the vehicle traveling condition then enters into the lock-up range. Then, the lock-up duty cycle D for the lock-up solenoid 4 is gradually increased with a predetermined time gradient which is the maximum gradient to transit from converter mode to lock-up mode without causing substantial lock-up shock. In response to this, the release pressure $P_R$ of the torque converter is gradually reduced. As a result, the engaging capacity determined by the pressure difference $P_A-P_R$ of the release pressure $P_R$ and the apply pressure $P_A$ is gradually increased. After a time $t_2$ where the engaging capacity reaches the coasting capacity which is required for coasting of the vehicle, the lock-up duty cycle D is maintained constant to maintain the lock-up capacity or engaging capacity at the coasting capacity. Thus, the lock-up state of the torque converter suitable for coasting of the vehicle can be maintained.

With the lock-up control in response to releasing of the accelerator pedal, the lock-up capacity will never exceed the coasting capacity required for coasting of the vehicle. Thus, lowering of the response characteristic in transition from the lock-up mode to the converter mode can be successfully avoided. Therefore, when the brake pedal is abruptly depressed for abrupt braking during lock-up control associated with releasing of the accelerator pedal, engine stalling due to delay of releasing of the lock-up clutch and thus of delay of releasing of lock-up state.

Furthermore, since the lock-up duty cycle D is gradually increased at the predetermined time gradient, establishment of the engaging condition of the lock-up clutch may be progressed moderately. Therefore, at the transition from the control of the engaging capacity of the lock-up clutch to the control of the coasting capacity, shock can be avoided.

As set forth above, in the lock-up control system according to the present invention, direct coupling of the input and output elements of the torque converter by engagement of the lock-up clutch, and the engaging capacity of the vehicle. Subsequently, progress of engaging of the lock-up clutch is terminated to maintain the engaging pressure at the coasting capacity required for coasting of the vehicle.

In the lock-up control induced by releasing of the accelerator pedal, the lock-up capacity will never exceed the coasting capacity. Therefore, even when abrupt braking is performed by depression of the brake pedal during lock-up control, the problem of engine stalling will never be caused due to delay of releasing of the lock-up clutch and whereby to delay releasing of the lock-up state.

On the other hand, when the vehicle traveling state enters into the lock-up range due to releasing of the accelerator, establishment of the lock-up state is gradually progressed with the predetermined time gradient. Therefore, shock will never be caused when the engaging capacity of the lock-up clutch reaches the coasting capacity.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

I claim:

1. A lock-up control system for a torque converter, in a vehicle transmitting a driving torque of a prime mover to wheels via a power transmission unit including the torque converter which can establish direct coupling between an input element and an output element, said lock-up control system comprising:

accelerator releasing detecting means for detecting releasing of an accelerator for operating the prime mover;

lock-up range detecting means for detecting a vehicle traveling condition falling detecting means for establishing direct coupling of said input and output elements of said torque converter by means of a lock-up clutch;

lock-up progressing means for progressing direct coupling between said input and output element of said torque converter by engagement of said lock-up clutch in response to said accelerator releasing detecting means and said lock-up range detecting means, when the vehicle traveling condition enters into the lock-up range;

coasting capacity detecting means for detecting an engaging capacity of said lock-up clutch as progressing establishment of lock-up state, reaching a coasting capacity required for coasting of the vehicle; and coasting capacity maintaining means for holding the engaging capacity of said lock-up clutch by interrupting progress of engagement of said lock-up clutch when the engaging capacity reaching said coasting capacity is detected.

2. A lock-up control system as set forth in claim 1, wherein said lock-up progressing means is constructed to gradually progress establishing of direct coupling of said input and output element of said torque converter by engagement of the clutch when the vehicle traveling condition enters into the lock-up region in response to releasing of the accelerator.

* * * * *